(12) United States Patent
Ying et al.

(10) Patent No.: US 7,743,411 B2
(45) Date of Patent: *Jun. 22, 2010

(54) METHOD AND APPARATUS FOR VOICE OVER INTERNET PROTOCOL TELEPHONY USING A VIRTUAL PRIVATE NETWORK

(75) Inventors: Goangshiuan Shawn Ying, Oakland, CA (US); Eugene L. Edmon, Danville, CA (US); Steve M. Aspell, Brentwood, CA (US); Holly Chan Chen, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 373 days.

This patent is subject to a terminal disclaimer.

(21) Appl. No.: 11/106,362

(22) Filed: Apr. 14, 2005

(65) Prior Publication Data

US 2006/0236388 A1 Oct. 19, 2006

(51) Int. Cl.
*H04L 29/06* (2006.01)
*H04L 12/403* (2006.01)

(52) U.S. Cl. .................. 726/15; 379/321; 455/403
(58) Field of Classification Search .................. 380/41, 380/256–257; 726/9, 12, 14–15, 29; 379/242, 379/265.13, 273, 283, 308, 321; 455/403, 455/419, 421, 445
See application file for complete search history.

(56) References Cited

U.S. PATENT DOCUMENTS

2002/0137490 A1* 9/2002 Gallant .................. 455/411
2003/0088767 A1* 5/2003 Emerson, III ............... 713/153
2004/0109438 A1* 6/2004 Chen .......................... 370/352
2004/0184425 A1* 9/2004 Lai et al. .................... 370/338
2004/0250130 A1* 12/2004 Billharz et al. ............. 713/201
2004/0268148 A1* 12/2004 Karjala et al. .............. 713/201
2005/0018849 A1* 1/2005 Rodriguez et al. .......... 380/257
2005/0068942 A1 3/2005 Chu
2005/0163316 A1* 7/2005 Wing .......................... 380/257
2005/0227670 A1 10/2005 Bicker

OTHER PUBLICATIONS

International Search Report and Written Opinion of the International Searching Authority for International Application No. PCT/US06/12115, Mailed on Jun. 18, 2007.
Supplemental European Search Report from the European Patent Office for corresponding EP Application No. 06740293.3 dated Jan. 27, 2010, 3 pages.

* cited by examiner

*Primary Examiner*—Gilberto Barron, Jr.
*Assistant Examiner*—Venkat Perungavoor
(74) *Attorney, Agent, or Firm*—Toler Law Group

(57) ABSTRACT

A system and method are disclosed for extending communications over the Internet by associating a telephone number with, for example a remote virtual private network (VPN) client IP address. A call can be received to the telephone number and an invite signal is provided to the remote VPN client utilizing the IP address. When the VPN client is able, a VPN can be established and the call can be routed to a phone associated with the remote VPN client IP address.

24 Claims, 3 Drawing Sheets

METHOD AND APPARATUS FOR VOICE OVER INTERNET PROTOCOL TELEPHONY USING A VIRTUAL PRIVATE NETWORK

FIELD OF THE DISCLOSURE

The present disclosure relates generally to Internet based communications, and more specifically to communications over a virtual private network.

DESCRIPTION OF THE RELATED ART

Telecommuting has become a popular way to conduct business. Allowing employees to work from home can be an efficient way to structure a business because it reduces the need for expensive office space and other operating expenses. Although operating overhead may be reduced, the allocation of, and administration of, certain infrastructure such as communication systems and particularly telephone communications can become very costly and complex. For example, expensing employee phone bills on a company balance sheet is cumbersome and awkward. Further, when an outside call is made to a place of business and the call needs to be transferred to the telecommuter, it is often difficult to efficiently and securely transfer the call to the telecommuter. Accordingly, there is a need for an efficient way to administrate a communications system for employees that telecommute.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DESCRIPTION OF THE DRAWINGS

Figure 1:
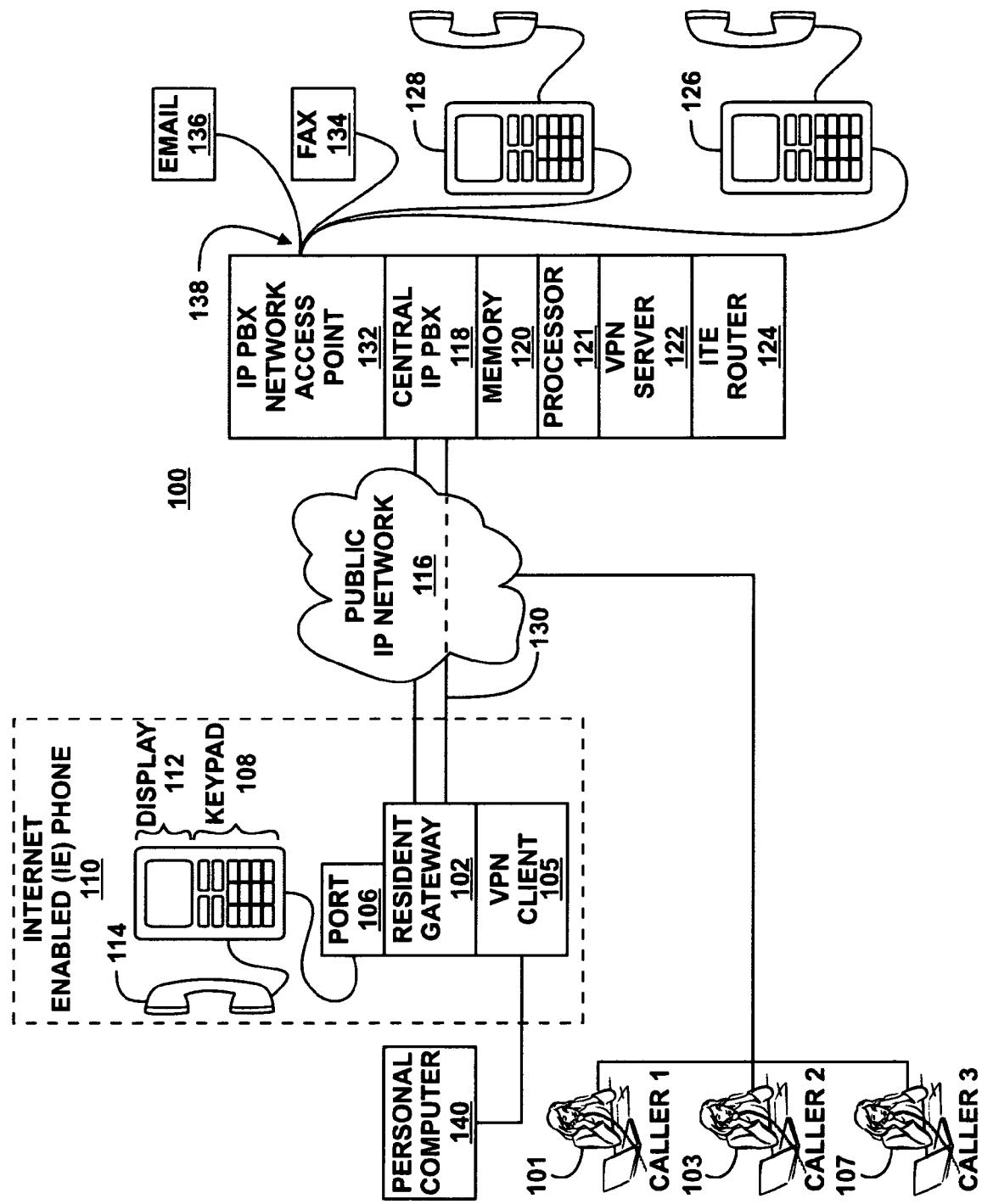
FIG. 1 is a general diagram illustrating a telephone network connecting outside callers to an Internet-enabled private branch exchange ("IP-PBX") and an Internet enabled telephone.

With broadband access to homes in urban areas and the advent of virtual private networks, telecommuting has become more commonplace. In the past, telecommuters often resorted to using cellular telephones or home telephones to facilitate voice communications. This "hybrid" communication system is often administrated by multiple service providers who are often paid through personal expense reports, credit cards, or corporate phone cards. Such a system can be very inefficient.

In accordance with the teachings disclosed herein, virtual private networks ("VPNs") may be used to facilitate private communications when telecommuting. Access to an employer's VPN server occasionally requires the telecommuter to use a personal computer ("PC") or a gateway with a VPN client, or software routine, that is installed and configured to establish a VPN tunnel from the telecommuter's PC/gateway to the employer's VPN server. A VPN tunnel may be established using many different architectures such as an ("IPSec") compliant system, as presented in Request for Comments ("RFC") 2401, Security Architecture for the Internet Protocol, dated November 1998.

If a telecommuter has the necessary hardware and software to establish a VPN and the employer has an Internet enabled phone system, then the telecommuter can place and receive "toll free" calls over the Internet. More specifically, if a telecommuter has access to a broadband connection and an Internet enabled ("IE") telephone the telecommuter can access an employers' IP-PBX.

An IE telephone can take many forms. An IE phone may be enclosed in a single package that is "Internet ready" and provides a user with "plug and play" functionality when connected to the Internet. The IE phone could also be a collection of components such as a standard phone and a converter box. For example, an IE phone could be a typical phone coupled to an adapter such as a digital subscriber line access multiplexer ("DSLAM"), an embedded multimedia terminal adapter ("EMTA"), or a cable modem termination system ("CMTS").

In accordance with the present disclosure an IE phone may be used to allow a telecommuter to make long distance phone calls from home or from a broadband access point. Moreover, the employer may be able to automatically and efficiently handle the administration of the call. Many issues can arise when extending telephone services from an IP-PBX to a remote Internet/broadband connection. One such issue arises when a call destined for the telecommuter at a remote connection is received by an employers IP-PBX. Most business related phone calls are of a confidential nature and forwarding a business call over the "unsecured environment" of the Internet generally, in not a preferred way to do business. Thus, if a call is received by a central IP-PEX that is destined for a telecommuter and a VPN connection does not exist between the telecommuter' s IE phone and the IP-PBX. it can be risky routing the call without some form of security. In practice, a VPN may be utilized but the VPN servers may not be configured to self-initiate private session with remote clients.

A traditional VPN is a configuration where two communicating network devices embed data in transmissions or encrypt data so that the content of the data cannot be easily decoded by devices processing or intercepting the transmissions. This communication link is often referred to as a "VPN tunnel." In accordance with the present teaching, a VPN tunnel 130 illustrates a virtual private communication link between the IP-PBX access point 132 and the residential gateway 102, wherein data "traveling through" the VPN tunnel 130 can be secure or encrypted data. The VPN tunnel 130 transits public IP network 116 possibly through a residential and corporate firewall (not shown) at the gateway 102 and IP-PBX access point 132 respectively. The VPN server 122 can be resident on a corporate LAN 138 or integral with IP-PBX access point 132 as illustrated.

Establishment of a VPN connection often requires a remote VPN client connected to the Internet to locate the VPN server through a user supplied universal resource indicator ("URI") or an IP address or a website address. Utilizing the address, the VPN client can gain authorization and initiate a VPN with the VPN server utilizing usernames, passwords and the like. In current systems, authorization data can be pre-entered into the central VPN server such that the VPN server can properly identify a requesting VPN client as an authorized client. Establishing and maintaining a VPN takes significant processing resources. Thus, when VPN's are inactive a VPN server typically "times out" the VPN and disconnects the VPN client.

In accordance with the teachings herein, a central VPN server at an IP-PBX can "invite" or "prompt" a remote VPN client to initiate a VPN. The invite can be generated based on a message intended for a remote VPN client. Depending upon implementation detail, the system can be configured such that when a telecommuter is working from home or at a public access point, the telecommuter can configure phone settings to accept or reject the invite from the central VPN server. If the IE phone is enabled to accept the invite, a VPN client coupled to the IE phone can accept the invite and initiate a VPN session with the central VPN server. When a VPN is established, the IE phone can accept calls such as outside calls from customers via the employer's telephone system. There may be a slight delay to the caller when such a system invites, initiates and executes a VPN then transfers the call. In other embodiments, different types of messaging systems that can connect to a VPN server can cause the VPN server to send an invite to various VPN clients distributed over the Internet. Systems such as a facsimile machine, e-mail system, a paging system, a video mail system and a scheduling system could all prompt a VPN server to send out invites to various VPN clients.

When a telecommuter's call is transmitted through the employer's telephone system, the employer can monitor activities and provide features to the telecommuting employee. For example, employer telephone features such as call timers, call recording, call forwarding, voice mail, and resources such as address books, calendars and other processes and databases could be made available to the telecommuter via the VPN.

Presently, traveling telecommuters can have access to a broadband connection from, for example, a hotel room, an airport or a coffee shop. These locations are often referred to as "hotspots" or "public access points". Using the public access point, a mobile employee can access an employer's IP-PBX and utilize the employers phone resources in accordance with the teachings herein.

In one configuration, a mobile IE phone is utilized by a mobile telecommuter to access an employer's IP-PBX when the employee is connected at a public Internet access point. When the central VPN server can locate the employee's IE phone at an access point, incoming calls to the employers IP-PBX that are intended for, or destined to, the mobile telecommuter can be efficiently routed. Further, other information or messaging systems could utilize the disclosed system and method for routing data or messages.

In a particular embodiment, a method is presented for establishing a procedure that will be utilized by a LAN based VPN server, to periodically connect and disconnect with a VPN client, a network device, or an IE phone over a VPN. Thus, one of the procedures would facilitate establishing a VPN connection when needed, disconnect the client during inactivity, and automatically re-establish the VPN responsive to a control signal from the central VPN server or the IE phone. Depending upon implementation detail, to set up a procedure for periodically establishing a VPN, the remote VPN client can initially be authorized by the central VPN server. After authorization, VPN configuration parameters such as a VPN client IP address, an IE phone IP address, a gateway IP address, a protocol configuration and a VPN process can be provided by the telecommuter's equipment to the VPN server. In one embodiment, the configuration parameters and the IP addresses can be stored such that they are available to the VPN server and possibly the VPN client.

In another embodiment a "plug and play" network device such as a personal computer or an IE phone having an incorporated VPN client can respond to an invite signal from a central VPN server and automatically request and establish a VPN communication link. Depending upon implementation detail, an initial "handshake" procedure can set up a "standby VPN configuration", wherein a VPN establishment procedure can be routinely executed to periodically establish VPN communication sessions between the IE phone and the IP-PBX access point responsive to messaging transmissions such as incoming calls destined for the telecommuter. The teachings herein may be better understood with reference to FIGS. 1 through 3.

FIG. 1 is a general diagram illustrating a system 100 that provides a direct and secured communication link between the IE telephone 110 having an incorporated VPN client 105, and a central IP-PBX access point 132 having an incorporated VPN server 122. In the illustrative embodiment the IP-PBX access point 132 also includes a central IP-PBX module 118, a processor 121, memory 120, and an Internet telephony enabled ("ITE") router 124. The IP-PBX access point 132 can be coupled to local phone extensions 126 and 128 that are connected to the IP-PBX access point 132 via LAN 132.

Phones external to the employers system such as those operated by first caller 101, second caller 103 and third caller 107 can be coupled to the IP-BPX access point 132 via the public IP network 116. The LAN 138 can also interconnect facsimile machine 134, e-mail server 136 and other messaging systems and devices such as computers that can communicate over the LAN 138. In one embodiment, the invite to establish a VPN can be generated by an information system such as e-mail server 136, a personal computer (not shown) and facsimile machine 134. Thus, an invite may be sent to the telecommuter's gateway 102 based on a facsimile transmission, video mail, organizer/planner software, or e-mail transmission that has a message or data for the telecommuter.

In the example of FIG. 1, the IE phone 110 can be physically located at a telecommuter's premises as illustrated or at a remote network access point including the employer's premise. Depending upon implementation detail the IE phone 110 can be connected to a public IP network 116 via a network interface such as an Ethernet switch, a hub, or as illustrated a residential gateway 102. In one embodiment the public IP network 116 can be a wide area network ("WAN") such as the Internet or any other communication system capable of providing secure communications.

As illustrated in the exemplary embodiment, the IE phone 110 can include a handset 114, a display 112 and a keypad 108 and can be connected to residential gateway 102 via port 106. Although only one IE phone 110 and one port 106 are illustrated, multiple phones could be connected to multiple ports of the residential gateway 102 in accordance with the teachings herein.

The residential gateway 102 can also provide public Internet/network access to a PC 140 and other network devices such as a home facsimile machine (not shown). Residential gateway 102 can include logic to prioritize data transmissions, for example, to prioritize voice data from the IE phone 110 over that of PC 140 as needed. Depending upon implementation detail, a modem within the residential gateway 102 can be configured to convert analog signals from a standard telephone format to a digital format and communicate digital voice data utilizing Internet telephony over the public IP network 116.

Some popular Internet telephony or digital voice data products and protocols include Voice over Internet protocol ("VoIP"), voice over Internet ("VOI"), CoolTalk™, and Net-Meeting™. In one configuration the IE phone 110 and the IP-PBX module 118 can be configured to communicate many different protocols over the Internet. The present teaching is not limited to a particular protocol or format. In another configuration the IE phone 110 contains one of an asynchronous digital subscriber line ("ADSL") modem, a digital subscriber line ("DSL") modem, a cable modem, or other high-speed interface such as an embedded multimedia terminal adapter ("EMTA") to properly configure signals for transmission over the Internet.

In one embodiment the residential gateway 102 provides a gateway for transmitting and receiving voice signals at the telecommuter's premise. Gateways are so named because they are pieces of equipment that facilitate the passage of data to and from a network. The gateway 102 can have an embedded VPN client 105 that can initiate a VPN with network devices such as VPN server 122.

A traditional VPN is a configuration where a two communicating network devices embed data in transmissions or encrypt data so that the content of the data cannot be easily decoded by devices processing or intercepting the transmissions. This communication link is often referred to as a "VPN tunnel." In accordance with the present teaching, a VPN tunnel 130 illustrates a virtual private communication link between the IP-PBX access point 132 and the residential gateway 102, wherein data "traveling through" the VPN tunnel 130 can be secure or encrypted data. The VPN tunnel 130 transits public IP network 116 possibly through a residential and corporate firewall (not shown) at the gateway 102 and IP-PBX access point 132 respectively. The VPN server 122 can be resident on a corporate LAN 138 or integral with IP-PBX access point 132 as illustrated.

There are various software clients that may be utilized to create the VPN. These clients may be resident on VPN server 122 and VPN client module 105. For example, Check Point™ Software Technologies Ltd. VPN-1® SecureClient™, or Netlock Technologies, Inc.'s VPN client (e.g., Contivity), may be utilized in VPN client 105 and VPN server 122 to facilitate a VPN.

Depending upon implementation detail, an ITE router 124 can be utilized to route incoming and outgoing calls to their intended destinations. The ITE router 124 can determine if an incoming call is destined for an IP address that is internal to, or external to, the employer's LAN 138. The ITE router 124 may have a list or table of telephone numbers that are to be forwarded to a remote IP address. The list can be dynamically updated such that the last known address or location of the telecommuter's phone is utilized to send the invite or the telecommuters home address may be utilized. Depending upon implementation detail the VPN client 105 can be configured to notify the VPN server 122 of its location automatically on a periodic basis.

In one configuration the ITE router 124 can determine the destination for a message or a call by utilizing data such as the number dialed of an incoming call or an address. Calls having a destination or a dialed number that is associated with an offsite IP address can be identified utilizing the look-up table. In the illustrated embodiment when an incoming call is identified as destined for an external extension or remote IP address, an invite signal can be generated by the VPN server 122 and sent over the public IP network 116 to the VPN client 105.

In alternate configurations the invite may utilize a mobile telephone network or another communication system or network capable of locating a telecommuter and communicating the invite. If the VPN client 105 is coupled to a communication system the VPN client can respond to the invite. Alternately, when a call is intended for an internal IP address, a private IP address or telephone number such as local extensions 128 or 126 the call can be routed as such. In one configuration the telecommuter can move from location to location wherein the VPN client 105 provides location status and the invite signal is sent to the most recently logged location.

Depending upon implementation detail, an initial VPN "handshake" procedure can occur wherein the IE phone 110 and/or it's associated components can communicate with components of the IP-PBX access point 132 and "set up" or configure a protocol or infrastructure that will control subsequent communication sessions. For example, a handshake can occur wherein the IE phone 110 or its associated components accesses the VPN server 122 and the VPN server 122 authenticates the IE phone 110 or phone system. Then, the IE phone 110 can provide an IP address to components of the IP-PBX access point 132. The IP address can be utilized in subsequent communication sessions by the ITE router 124 or the VPN server 122 to send the invite signal. It is desirable that the IP address can be readily available to the IP-PBX module 118, the VPN server 122 and/or the ITE router 124. Likewise an IP address of the VPN server 122 and other communication parameters can be provided by devices, clients and components of the IP-PBX access point 132 and the communication parameters can be stored by components of the IE phone 110.

In one configuration, a call destined for the remotely located IE phone 110 is received by the IP-PBX network access point 132, and responsive to the data associated with the incoming call such as the dialed number, the ITE router 124 can identify the destination for the call wherein the destination can be an offsite IP address. Depending upon implementation detail, using a lookup table in memory 120, it can be determined if the destination IP address or telephone number associated with the call is a number or address that is intended for an IP phone that is presently or was last connected at a location that is external to the LAN 138. If the IP address identifies an external location then the processor 121 can send an invite signal over the public IP network 116 utilizing the stored IP address.

In one embodiment, a direct inward dial ("DID") system can be supported by the IP-PBX network access point 132. A typical DID system includes a configuration where a block of telephone numbers are assigned to the IP-PBX 118. Using a DID system, a company can offer its employees individual phone numbers without requiring a physical line into the IP-PBX access point 132 for each phone number. In this configuration the IP-PBX access point 132 would automatically switch a call for a given phone number to the appropriate location, which may be a remote location.

Depending upon implementation detail, a processor such as processor 121 can be integrated with the components of IP-PBX access point 132. Processor 121, utilizing instructions retrieved from memory 120, can facilitate the processing of a call including sending an invite signal and creating and maintaining a VPN. Processor 121 can also route calls from outside callers such as first caller 101, second caller 103, or third caller 107 to local extensions such as local extension 128. In one embodiment, an interactive and automated call answering system such as an interactive voice response ("IVR") system could be provided by, or controlled by the processor 121. The IVR could receive a call, provide additional prompts to the caller and accept caller input such as an employee's or a departmental extension. Based on this input the processor 121 could generate the VPN invite signal.

In one embodiment, when a call has data that defines a destination for the call, the processor 121 can determine where to send the call. When it is recognized that the call data provides for routing the call to a remote location, the processor 121 can determine if a VPN exists and send the invite signal to the IE phone 110 or the VPN client 105 when a VPN does not exist. Depending upon implementation detail the IE phone 110 can be configured with different replies to the invite including a do not disturb signal, a busy signal, an availability signal indicating availability to establish a VPN, an in process signal indicating that a VPN is in process, or an invite accept signal that commences the creation of a VPN.

When the need for communications is no longer present, the VPN session can be concluded automatically due to inactivity or at the request of the user, the VPN server 122 or the VPN client 105. Thus, a configuration is taught that can automatically establish, disconnect and re-establish a VPN wherein the VPN can be initiated by control signals originating from the IP-PBX network access point 132.

In a particular embodiment, the IE phone 110 can include a VPN client module 105, a coder, a decoder, and a data processor responsive to the encoder and decoder. The IE phone 110 may also include a visual display 112 that is responsive to user input and a VPN status. The visual display 112 can display the status of a VPN session, the presence of an invite signal, selectable VPN features, dialed numbers and other call data such as caller ID, call waiting ID, and the like. An example of a VPN session data that can be provided on the display 112 is messaging information sent during the establishment of, or invitation to establish a VPN connection, (e.g., incoming invite); VPN session in progress; concluding the VPN session; VPN session concluded, or similarly informative messages.

It will be appreciated that other components may be incorporated into the IE phone 110 which are not specifically illustrated herein. Examples of other components include a serial interface to allow communication to another device to permit coordination of telephone/address book information, to provide automatic dialing functions and other time saving features. Functions to perform Internet telephony, call processing, protocol processing, and network management software may also be integrated with or interfaced with the IE phone 110.

Figure 2:
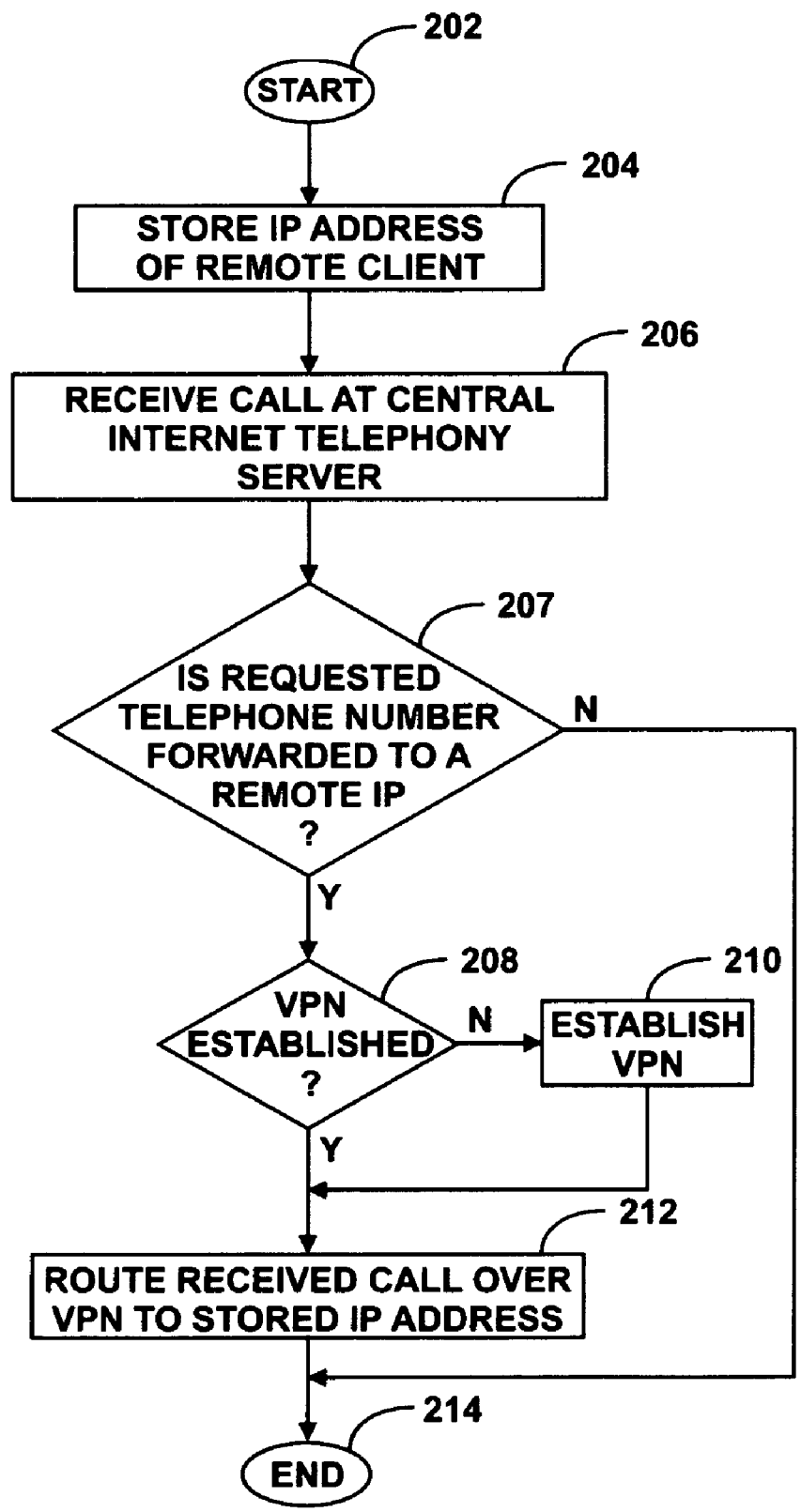
FIG. 2 is a flow diagram illustrating a method for establishing Internet telephone communications.

Referring to the illustrative embodiment of FIG. 2, a method for performing an initial "handshake" procedure and then routing calls or transferring calls to a remote telephone extension over a secure network is illustrated. In accordance with one embodiment of the present disclosure a configuration for establishing and re-establishing a secure Internet telephony communication link on an as needed basis is presented.

The process may start at step 202 and at step 204 data such as an IP address of a remote client possibly an Internet enabled telephone is stored at a central location. In a particular embodiment, this initial "VPN handshake session" is initiated by a user employing the keypad of the IP phone to dial a number and enter a user name and a password. During the handshake session, an IP address of the IP phone, the type of software to be utilized and other communication parameters can be provided then stored at a central location proximate to a private branch exchange. The handshake can also occur periodically based on a change of status, periodically during VPN sessions, and possibly without the presence of a VPN.

In one embodiment the central location can be implemented by a private branch exchange ("PBX") that is compatible with Internet telephony. When a call is received at the PBX, call data is processed to determine if the intended recipient of the call has a remote IP address stored at the receiving location at decision step 207. If the intended recipient does not have an available remote IP address then the process ends at step 214. However, when at decision step 207 the intended recipient has a remote IP address stored, the PBX can determine if there is a VPN established with a client at the remote IP address at decision step 208. If a VPN is established the call can be transferred to the intended recipient over the VPN. When there is no VPN established, a VPN is established at step 210 based on an invite from the central location. When the VPN is established the call is routed over the VPN to the intended recipient utilizing the stored IP address at step 212. The process ends at step 214.

Depending upon implementation detail when a VPN is desired a VPN invite signal can be originated by a central Internet telephony system and sent to a remote IP enabled telephone. Responsive to the invite, a VPN client within the IP phone can negotiate a VPN session between the Internet telephony system and the IP phone. In a particular embodiment, negotiating the VPN session includes sending a first authentication message from the IP telephone/VPN client to the central VPN server. A second authentication message from the central VPN server can then be received by the VPN client. A VPN tunnel can then be established in response to receiving the second "confirmation" data transmission at the VPN client. Once established, secure transmissions can proceed be provided via the VPN.

Figure 3:
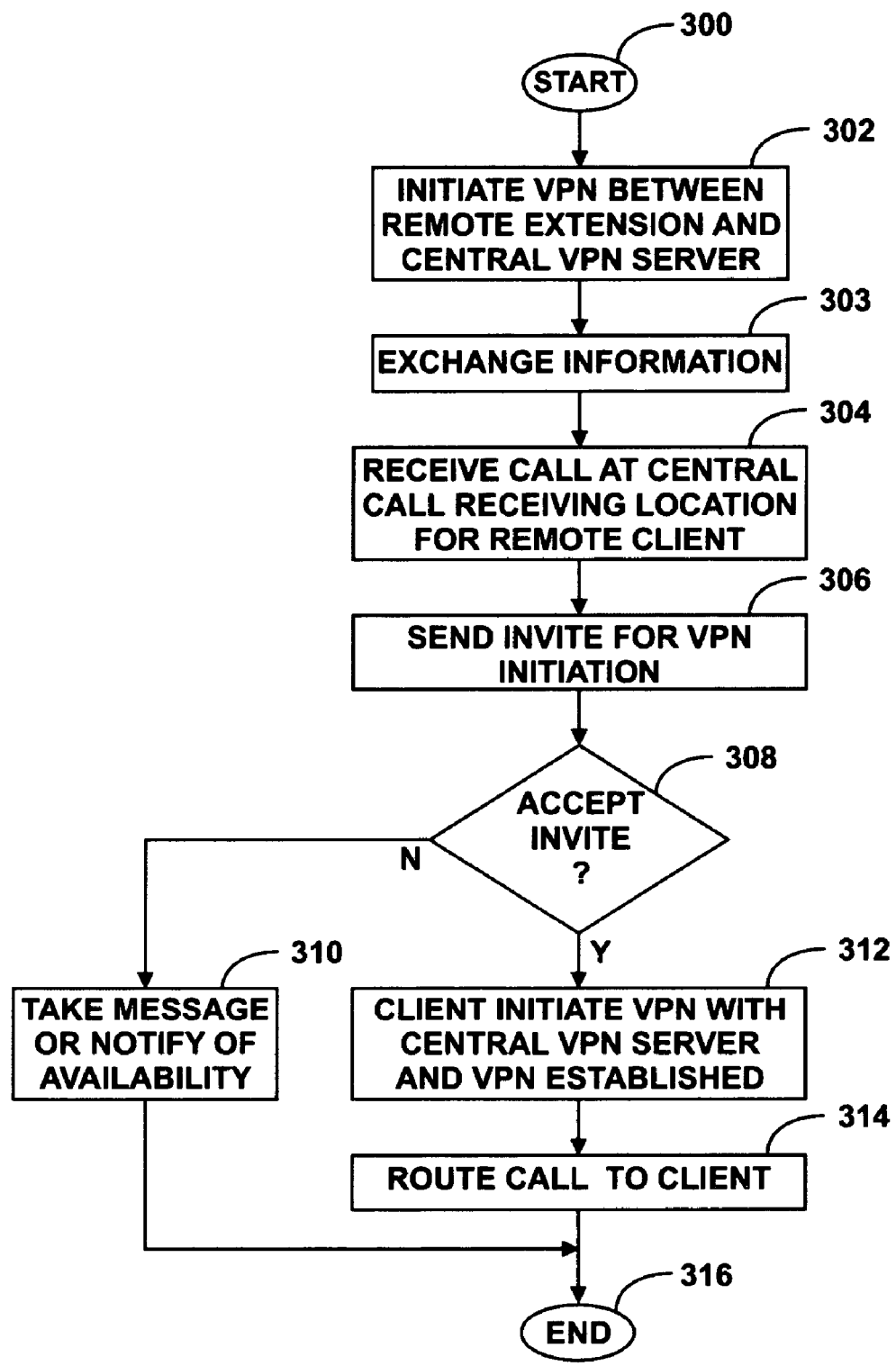
FIG. 3 is a flow diagram illustrating alternate method for establishing a voice based communication link using a virtual private network ("VPN") client within an Internet enabled telephone apparatus.

Referring to FIG. 3, an exemplary embodiment of an Internet based telephone system having remote network phone extensions is provided. In a particular embodiment the process starts at step 300 and at step 302 a VPN client possibly incorporated into an IP enabled telephone establishes a VPN tunnel directly from the VPN client to an employers PBX. In one embodiment the VPN tunnel can be initiated by a keypad entry or function key input by the user of the IP telephone. The VPN can be utilized by the IP phone and the PBX to exchange information that will configure ongoing intermittent or occasional VPN sessions at step 303. Such information or parameters that can be exchanged can include is the IP phone's remote IP address, the availability of the IP phone to accept calls, login parameters such as passwords, and the like. In one embodiment the central PBX can assign an IP address to the IP phone.

Generally, this initialization information can be entered by the user, computer support provider, or automatically detected by the VPN client during the first initialization. After initial entry the information can be stored in the processor memory of the VPN client module and a central VPN server. In subsequent VPN initializations, the information can be retrieved from the VPN client module's memory and the VPN server memory. Thus at step 303 information is exchanged between the VPN client and the VPN server such that a periodic VPN can be established responsive to a message or call awaiting delivery or a transfer.

When a call is received at the PBX that has call data indicating that the call is to be routed to a remote IP phone at step 304, a remote IP address is utilized to send an invite to the IP phone or VPN client of the IP phone as illustrated in step 306. Depending upon implementation detail, it is determined if the VPN client or the IP phone will accept the invite at decisions step 308. When the VPN client will not accept the invite or does not reply to the invite, a message is taken or the call is notified of the unavailability of the requested party at step 310. However, when at decision step 308 the VPN client accepts the invite, a VPN session can be created between the VPN server and the VPN client at step 312. The call can then be routed at step 314 and the process ends at step 314.

During a VPN session, a secure telephone call or secure data can be provided. In one embodiment after a call is complete the VPN remains and additional telephone call can be made to others during the same VPN session. When the VPN secure session is no longer required, the user can request to conclude the VPN session. In a particular embodiment, the request to conclude the session is in response to a keypad input from the user, e.g., a function key, or series of numbers/characters entered by a user with the keypad. Depending upon implementation, replacing the handset in the IP phone cradle may not conclude the VPN session. However a request to conclude the VPN session may also be transmitted in response to the user "hanging up" the handset or controlling the VPN from the telephone keypad when prompted by a display.

The IP phone as described may offer advantages to the mobile employee who chooses to bring the IP phone from work to home, or when traveling. When using an IP phone from home or from a hotel, the mobile employee in this case no longer has to rely on a corporate phone card or personal expense for long-distance calls, as long as broadband access is available. Moreover, in addition to the cost savings on long distance calls, the IP telephone can establish a VPN tunnel to the VPN server at the employer's corporate LAN for secured (encrypted) voice communications and facsimile transmissions.

The method and apparatus described herein provides for a flexible implementation. Although the invention has been described using certain specific examples, it will be apparent to those skilled in the art that the invention is not limited to these few examples. Additionally, various types of IP telephones and VPN client software are currently available which could be suitable for use in direct and secured IP communications when employing the method and apparatus as taught herein. The above-disclosed subject matter is to be considered illustrative, and not restrictive and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing a call using a central virtual private network (VPN) server, the method comprising:
   associating a telephone number with a remote VPN client;
   linking the telephone number to an Internet protocol (IP) address associated with the remote VPN client;
   receiving, at the central VPN server, a call addressed to the telephone number associated with the remote VPN client, wherein the central VPN server is associated with a local area network (LAN);
   determining based on a look-up table whether the IP address is external to the LAN;
   determining whether a connection between the central VPN server and the remote VPN client is a secure connection;
   sending, using the IP address, an invitation to the remote VPN client when the connection is not secure, the invitation requesting the remote VPN client to establish a secure connection with the central VPN server, wherein the invitation is sent in response to receiving the call at the central VPN server and determining that the IP address is external to the LAN;
   initiating a secure connection via a virtual private network connection to the remote VPN client when the remote VPN client accepts the invitation; and
   routing the call to the VPN client via the virtual private network connection.

2. The method of claim 1, wherein the call is one of a voice based communication, a facsimile based communication, an e-mail based communication, and a message based communication.

3. The method of claim 1, further comprising:
   initializing the VPN client by at least partially connecting with the central VPN server;
   authorizing the VPN client as a remote client of the central VPN server;
   authorizing a remote phone as a telephone extension of the central VPN server; and
   providing the VPN client with an IP address associated with the central VPN server.

4. The method of claim 1, further comprising;
   disconnecting the secure connection responsive to a signal;
   sending a second invitation from the central VPN server to the remote client to re-establish the secure connection responsive to a second call; and
   re-establishing a secure connection between the central VPN server and the remote VPN client responsive to the VPN client accepting the second invitation.

5. The method of claim 1, wherein establishing the virtual private network connection between the remote VPN client and the central VPN server further comprises authorizing the remote VPN client at the central VPN server utilizing security information.

6. The method of claim 1, wherein the remote VPN client is moved to a different location and the invitation is sent to the different location.

7. The method of claim 1, further comprising selecting a do not disturb option wherein the remote VPN client can accept or reject invitations from the central VPN server to establish a VPN connection.

8. The method of claim 1, wherein the remote VPN client is co-located with a residential gateway.

9. A system for Internet based communications comprising:
   an Internet enabled call-processing platform having an associated input configured to receive an incoming call signal, the incoming call signal having a destination address useable to route an incoming call to a remote virtual private network (VPN) client;
   a memory communicatively coupled to the processing platform and configured to store a local network address and a remote network address for the remote VPN client;
   a virtual private network (VPN) server responsive to the call-processing platform, wherein the VPN server is associated with a local area network (LAN) and wherein the VPN server is configured to:
      determine based on a look-up table whether the remote network address is external to the LAN;
      send an invitation to establish a secure connection to the remote network address when the incoming call signal is to be routed to the remote network address after determining that the connection between the VPN server and the VPN client is not secure and that the remote network address is external to the LAN, wherein the invitation is sent in response to receiving the incoming call signal at the call-processing platform; and
      initiate the secure connection to the VPN client.

10. The system of claim 9, wherein the destination address is one of a telephone number and an IP address.

11. The system of claim 9, wherein the call-processing platform supports a direct inward dial configuration.

12. The system of claim 9, wherein the destination address is assigned by a private telephone switching network responsive to processing the incoming call signal.

13. The system of claim 9, further comprising a voice enabled router configured to convert the destination address of the incoming call signal to an IP address and to route the incoming call signal to the remotely located telephone extension over the Internet.

14. The system of claim 9, wherein the client provides a do not disturb signal responsive to the invitation to establish a virtual private network.

15. The system of claim 9 wherein the VPN server sends the invitation to a client VPN engine at the remotely located telephone extension and the client initiates a creation of a virtual private network with the VPN server.

16. A method for providing remote extensions for a telephone exchange comprising:

receiving an Internet protocol (IP) address for a remote Internet enabled phone at a central Internet enabled telephone switch, wherein the central Internet enabled telephone switch is associated with a local area network (LAN);

determining based on a lookup table whether the IP address is external to the LAN;

determining whether a connection between the remote Internet enabled phone and the central Internet enabled telephone switch is secure;

utilizing the IP address to send an invitation to the remote Internet enabled telephone to create a virtual private network with the central Internet enabled telephone switch responsive to a signal received by the central Internet enabled telephone switch when the connection is not secure and the IP address is external to the LAN, wherein the signal is a call addressed to the remote Internet enabled phone; and establishing a secure connection between the remote Internet enabled telephone and the central Internet enabled telephone switch after the remote Internet enabled telephone accepts the invitation.

17. The method of claim 16, further comprising receiving authorization parameters at the central Internet enabled telephone switch.

18. The method of claim 16, further comprising storing the IP address of the remote Internet enabled telephone in a memory local to the central Internet enabled telephone switch.

19. The method of claim 18, further comprising receiving a request to communicate with a user associated with the remote Internet enabled telephone and retrieving the IP address from the memory.

20. The method of claim 16, further comprising prepopulating the remote Internet enabled telephone with an IP address of the central Internet enabled telephone switch.

21. The method of claim 16, further comprising associating a multi-digit telephone number with the IP address.

22. A computer readable medium tangibly embodying a program of instructions to manipulate a processor to:

associate a multi-digit telephone number with a remote virtual private network (VPN) client utilizing an Internet protocol (IP) address;

receive a call at a VPN server addressed to the multi-digit telephone number, wherein the VPN server is associated with a local area network (LAN); determine based on a look-un table whether the IP address is external to the LAN;

send an invitation to the remote VPN client to establish a secure connection to the VPN server after the VPN server determines that the connection is not secure and the IP address is external to the LAN, wherein the invitation is sent in response to receiving the call at the VPN server;

establish a secure connection via a VPN connection after the remote VPN client accepts the invitation; and route the call to the remote VPN client via the VPN connection.

23. The computer readable medium of claim 22, wherein the instructions further manipulate the processor to send voice communications via the VPN connection.

24. The computer readable medium of claim 22, wherein the instructions further manipulate the processor to send the invitation responsive to one of a voice message, an e-mail, a facsimile transmission, a pager, and a scheduling client.

\* \* \* \* \*